US011395059B2

(12) United States Patent
Gong et al.

(10) Patent No.: US 11,395,059 B2
(45) Date of Patent: Jul. 19, 2022

(54) MASTER/SLAVE SWITCHING METHOD FOR WEARABLE APPARATUS AND RELATED PRODUCT

(71) Applicant: GUANGDONG OPPO MOBILE TELECOMMUNICATIONS CORP., LTD., Guangdong (CN)

(72) Inventors: Jinhua Gong, Guangdong (CN); Baoti Li, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/163,060

(22) Filed: Jan. 29, 2021

(65) Prior Publication Data
US 2021/0152920 A1 May 20, 2021

Related U.S. Application Data

(63) Continuation of application No. PCT/CN2019/098952, filed on Aug. 1, 2019.

(30) Foreign Application Priority Data

Aug. 1, 2018 (CN) .......................... 201810866658.9

(51) Int. Cl.
*H04R 1/10* (2006.01)
*H04M 1/72412* (2021.01)
*H04B 1/3827* (2015.01)

(52) U.S. Cl.
CPC ........... *H04R 1/1041* (2013.01); *H04B 1/385* (2013.01); *H04M 1/72412* (2021.01); *H04B 2001/3872* (2013.01)

(58) Field of Classification Search
CPC .. H04R 1/1041; H04M 1/72412; H04B 1/385
See application file for complete search history.

(56) References Cited

U.S. PATENT DOCUMENTS

2009/0154739 A1* 6/2009 Zellner .................... H04R 3/00
381/311
2017/0264987 A1 9/2017 Hong et al.
(Continued)

FOREIGN PATENT DOCUMENTS

CN 102611961 A 7/2012
CN 103312889 A 9/2013
(Continued)

OTHER PUBLICATIONS

International Search Report with English Translation for International application No. PCT/CN2019/098952, dated Oct. 14, 2019 (12 pages).
(Continued)

*Primary Examiner* — Simon King
(74) *Attorney, Agent, or Firm* — Young Basile Hanlon & MacFarlane, P.C.

(57) ABSTRACT

Embodiments of the present application disclose a master/slave switching method for a wearable apparatus and a related product. The wearable apparatus comprises: a first earphone and a second earphone. The wearable apparatus is connected to an electronic device. The method comprises the following steps: an electronic device acquiring a first earphone audio type matching a first earphone and a second earphone audio type matching a second earphone, wherein different audio types correspond to different priorities; the electronic device determining a first application currently operating; and the electronic device determining, according to the first application, the first earphone audio type, and the second earphone audio type, whether to perform switching between a master earphone and a slave earphone for the (Continued)

wearable apparatus. The technical solution provided by the present application achieves an improved user experience.

20 Claims, 4 Drawing Sheets

(56) References Cited

U.S. PATENT DOCUMENTS

| | | | | |
|---|---|---|---|---|
| 2018/0084569 | A1* | 3/2018 | Li | H04W 72/1263 |
| 2018/0084606 | A1* | 3/2018 | Li | H04W 88/04 |
| 2020/0007989 | A1* | 1/2020 | Gong | H04R 3/12 |
| 2020/0336854 | A1* | 10/2020 | Wang | H04R 1/028 |

FOREIGN PATENT DOCUMENTS

| | | |
|---|---|---|
| CN | 106792441 A | 5/2017 |
| CN | 107071618 A | 8/2017 |
| CN | 107071620 A | 8/2017 |
| CN | 107277668 A | 10/2017 |
| CN | 107820155 A | 3/2018 |
| CN | 108271090 A | 7/2018 |
| CN | 109150221 A | 1/2019 |
| EP | 3300396 A1 | 3/2018 |

OTHER PUBLICATIONS

First Office Action from China patent office with English Translation for counterpart Chinese patent Application 201810866658.9, dated Sep. 25, 2019 (10 pages).

Notification to Grant Patent Right with English Translation for Chinese application No. 201810866658.9, dated Feb. 21, 2020 (6 pages).

Extended European Search Report for EP Application 19843547.1 dated Jul. 27, 2021. (7 pages).

* cited by examiner

MASTER/SLAVE SWITCHING METHOD FOR WEARABLE APPARATUS AND RELATED PRODUCT

CROSS-REFERENCE TO RELATED APPLICATION(S)

The present application is a continuation-application of International (PCT) Patent Application No. PCT/CN2019/098952 filed on Aug. 1, 2019, which claims foreign priority of Chinese Patent Application No. 201810866658.9, filed on Aug. 1, 2018, the entire contents of all of which are hereby incorporated by reference.

TECHNICAL FIELD

The present disclosure relates to the technical field of accessories of mobile terminals, and in particular, to a master/slave switching method for a wearable apparatus and a related product.

BACKGROUND

With the popularity and application of smart phones, users are increasingly relying on smart phones. Wearable apparatuses, such as wireless earphones, smart watches, smart bracelets, etc., have also been widely used with the rise of smart phones. For wearable apparatuses, wireless headsets are taken as an example here. Wireless headsets have the advantage of being convenient to be connected with smart phones.

SUMMARY

Embodiments of the present disclosure provides a master/slave switching method for a wearable apparatus and a wearable apparatus, which are intended to perform master/slave switching for two earplugs according to an application, improve endurance of batteries of the earplugs, and improve experience of users.

In a first aspect, an embodiment of the present disclosure provides a master/slave switching method for a wearable apparatus. The wearable apparatus comprises: a first earphone and a second earphone, one of the first and second earphones is defined as a master earphone and the other of the first and second earphones is defined as a slave earphone. The method comprises the following operations: acquiring a first earphone audio type matching a first earphone and a second earphone audio type matching a second earphone; determining a first application currently operating; and determining, according to the first application, the first earphone audio type, and the second earphone audio type, whether to perform switching between the master earphone and the slave earphone for the wearable apparatus.

A second aspect provides an electronic device, the electronic device comprises: a communication element and a processor; wherein: the communication element is configured to implement wireless connection with the wearable apparatus provided by the first aspect, and acquire the first earphone audio type matching the first earphone and a second earphone audio type matching the second earphone through the wireless connection; the processor is configured to determine a first application currently operating, and determine, according to the first application, the first earphone audio type, and the second earphone audio type, whether to perform switching between the master earphone and the slave earphone for the wearable apparatus.

A third aspect provides a computer readable storage medium, which stores a computer program for electronic data exchange, wherein the computer program makes a computer perform the method provided by the first aspect.

It can be seen that the electronic device in the technical solution provided by the present disclosure acquires the first earphone audio type and the second earphone audio type of the two earphones, and then selects a master earphone and a slave earphone according to the currently operating first application, such that the master and slave earphones match the currently operating first application, and the experience of users is improved.

BRIEF DESCRIPTION OF DRAWINGS

In order to describe technical solutions in embodiments of the present disclosure or in the prior art more clearly, drawings required being used in description of the embodiments or of the prior art will be simply introduced below. Obviously, the drawings in the following description are merely some embodiments of the present disclosure. For one of ordinary skill in the art, it is also possible to obtain other drawings according to these drawings without paying any creative work.

DETAILED DESCRIPTION

Figure 1:
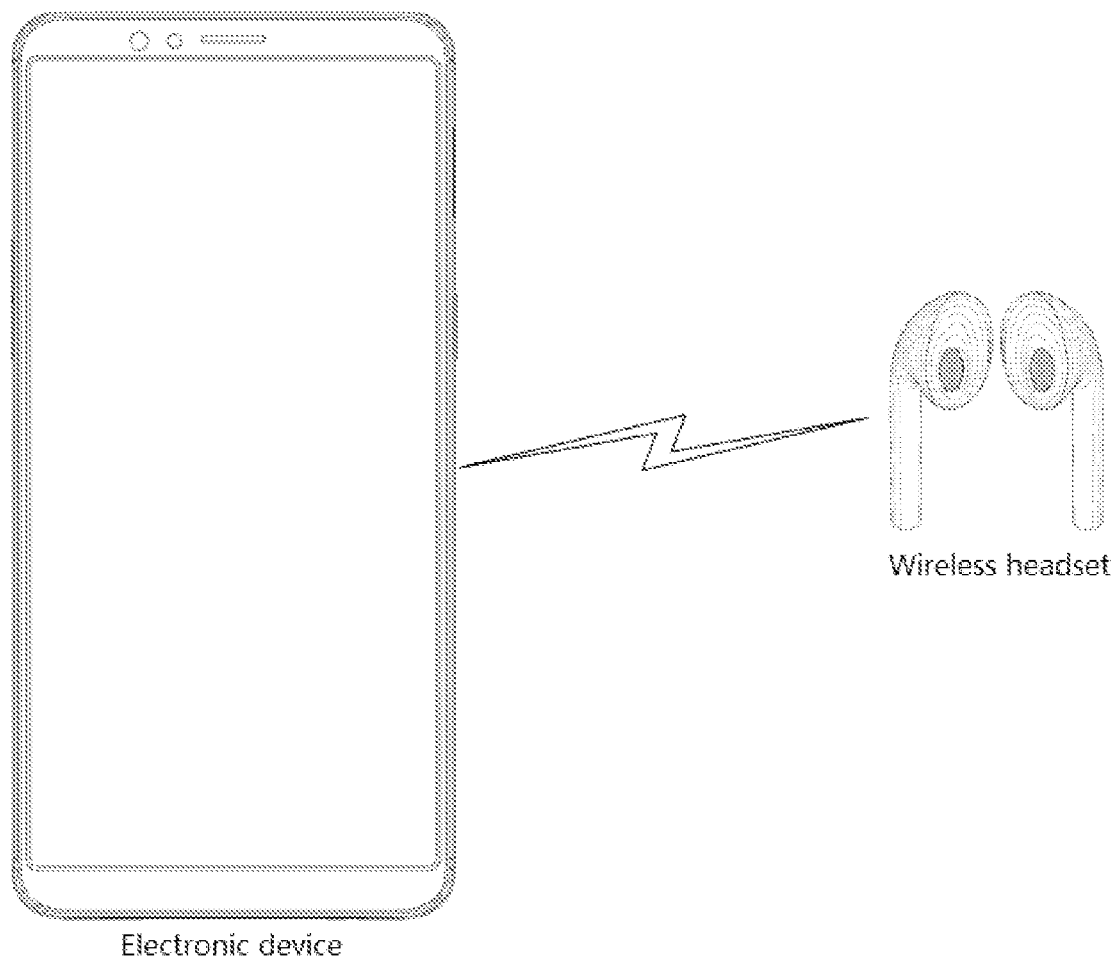
FIG. 1 is a schematic view of a connection manner between a wearable apparatus provided by an embodiment of the present disclosure and an electronic device provided by an embodiment of the present disclosure.

Technical solutions in embodiments of the present disclosure will be described clearly and completely below in accompany with drawings in embodiments of the present disclosure. Obviously, the described embodiments are merely some embodiments of the present disclosure, but not all embodiments. Based on embodiments of the present disclosure, all other embodiments obtained by one of ordinary skill in the art without paying any creative work belong to the protection scope of the present disclosure.

The terms "first", "second", and the like in the specification, claims, and aforesaid drawings of the present disclosure are used to distinguish different objects, rather than describing a specific order. In addition, the terms "comprise", "have", and any variations thereof are intended to cover non-exclusive inclusions. For example, a process, method, system, product, or device comprising a series of operations or units is not limited to the listed operations or units, but Alternatively further comprises unlisted operations or units, or Alternatively further comprises other operations or units inherent in the process, method, product or device.

Reference to "an embodiment" herein means that particular features, structures, or characteristics described in connection with embodiments may be included in at least one embodiment of the present disclosure. Appearances of this phrase in various places in the specification are not necessarily all referring to the same embodiment, nor are they independent or alternative embodiments that are mutually exclusive with other embodiments. It is explicitly and implicitly understood by those skilled in the art that the embodiments described herein may be combined with other embodiments.

Wireless communication devices involved in embodiments of the present disclosure may include various handheld devices, vehicle-mounted devices, wearable devices, and computing devices with wireless communication functions, or other processing devices connected to wireless modems, and various forms of user equipments (UE), mobile stations (MS), terminal devices, and so on. For ease of description, the devices mentioned above are collectively referred to as wireless communication devices.

The above-mentioned wireless communication devices can be connected with wearable apparatuses. The wearable apparatus, such as a wireless headset, generally has two earphones, and the two earphones have individual batteries and power supply systems. Endurances of the batteries of the two earphones are short, which affects experience of users.

In the method provided by the first aspect, the first earphone audio type is determined through an application playing first earphone audio, and the second earphone audio type is determined through application playing second earphone audio.

In the method provided by the first aspect, that the electronic device determines, according to the first application, the first earphone audio type, and the second earphone audio type, whether to perform switching between a master earphone and a slave earphone for the wearable apparatus specifically comprises: in response to determining that the master earphone is the first earphone, and the audio type determined by the first application belongs to the first earphone audio type, not performing switching between the master earphone and the slave earphone; in response to determining that the master earphone is the first earphone, and the audio type determined by the first application does not belong to the first earphone audio type but belongs to the second earphone audio type, performing switching between the master earphone and the slave earphone.

In the method provided by the first aspect, that the electronic device determines, according to the first application, the first earphone audio type, and the second earphone audio type, whether to perform switching between a master earphone and a slave earphone for the wearable apparatus specifically comprises: in response to determining that the master earphone is the first earphone, and the audio type determined by the first application does not belong to the first earphone audio type but belongs to the second earphone audio type, acquiring a first remaining capacity of the first earphone and a second remaining capacity of the second earphone, and calculating a first difference value between the second remaining capacity and the first remaining capacity; when the first difference value is larger than a capacity threshold value, performing switching between the master earphone and the slave earphone; when the first difference value is a negative value and is less than the capacity threshold value, not performing switching between the master earphone and the slave earphone.

In the method provided by the first aspect, the method, between the when the first difference value being a negative value and being less than the capacity threshold value and the not performing switching between the master earphone and the slave earphone, further comprises: after a delay setting time, acquiring the first remaining capacity and the second remaining capacity again, and calculating a second difference value between the second remaining capacity and the first remaining capacity after the setting time; when the second difference value is a negative value and is less than the capacity threshold value, determining not performing switching between the master earphone and the slave earphone.

In the method provided by the first aspect, that the electronic device determines, according to the first application, the first earphone audio type, and the second earphone audio type, whether to perform switching between a master earphone and a slave earphone for the wearable apparatus specifically comprises: in response to determining that the master earphone is the first earphone, and the audio type determined by the first application does not belong to the first earphone audio type but belongs to the second earphone audio type, acquiring a first remaining capacity of the first earphone and a second remaining capacity of the second earphone, and calculating a first difference value between the second remaining capacity and the first remaining capacity; when the first difference value is negative and the second remaining capacity is less than a minimum capacity, prohibiting switching the master earphone to be the second earphone.

In the method provided by the first aspect, the method further comprises: acquiring a type and a running time of the first application, determining the number of earphones running the first application according to the type, calculating the first remaining capacity of the first earphone and the second remaining capacity of the second earphone according to the number of earphones and the running time, and determining whether it is required to stop switching between the master and slave earphones according to the first remaining capacity and the second remaining capacity.

In the method provided by the first aspect, the determining whether it is required to stop switching between the master and slave earphones according to the first remaining capacity and the second remaining capacity specifically comprises: when both the first remaining capacity and the second remaining capacity are less than a minimum capacity, stopping switching between the master and slave earphones.

In the method provided by the first aspect, the performing switching between the master earphone and the slave earphone specifically comprises: switching the second earphone to be the master earphone, and switching the first earphone to be the slave earphone.

In the method provided by the first aspect, the method further comprises: implementing wireless connection between the wearable apparatus and an electronic device; wherein the acquiring a first earphone audio type matching a first earphone and a second earphone audio type matching a second earphone, the determining a first application currently operating; and the determining, according to the first application, the first earphone audio type, and the second earphone audio type, whether to perform switching between the master earphone and the slave earphone for the wearable apparatus are performed by the electronic device.

In the method provided by the first aspect, the acquiring a first earphone audio type matching a first earphone and a second earphone audio type matching a second earphone, the determining a first application currently operating; and the determining, according to the first application, the first earphone audio type, and the second earphone audio type, whether to perform switching between the master earphone and the slave earphone for the wearable apparatus are performed by the wearable apparatus.

In the electronic device provided by the second aspect, the processor is further configured to determine the first earphone audio type through an application playing a first earphone audio, and determine the second earphone audio type through application playing a second earphone audio.

In the electronic device provided by the second aspect, the processor is specifically configured to: in response to determining that the master earphone is the first earphone, and the audio type determined by the first application belongs to the first earphone audio type, not perform switching between the master earphone and the slave earphone; in response to determining that the master earphone is the first earphone, and the audio type determined by the first application does not belong to the first earphone audio type but belongs to the second earphone audio type, perform switching between the master earphone and the slave earphone.

In the electronic device provided by the second aspect, the processor is specifically configured to: in response to determining that the master earphone is the first earphone, and the audio type determined by the first application does not belong to the first earphone audio type but belongs to the second earphone audio type, acquire a first remaining capacity of the first earphone and a second remaining capacity of the second earphone, and calculate a first difference value between the second remaining capacity and the first remaining capacity; when the first difference value is larger than a capacity threshold value, perform switching between the master earphone and the slave earphone; when the first difference value is a negative value and is less than the capacity threshold value, not perform switching between the master earphone and the slave earphone.

In the electronic device provided by the second aspect, the processor is specifically configured to: after a delay setting time, acquire the first remaining capacity and the second remaining capacity again, and calculate a second difference value between the second remaining capacity and the first remaining capacity after the setting time; when the second difference value is a negative value and is less than the capacity threshold value, determine not performing switching between the master earphone and the slave earphone.

In the electronic device provided by the second aspect, the processor is specifically configured to: in response to determining that the master earphone is the first earphone, and the audio type determined by the first application does not belong to the first earphone audio type but belongs to the second earphone audio type, acquire a first remaining capacity of the first earphone and a second remaining capacity of the second earphone, and calculate a first difference value between the second remaining capacity and the first remaining capacity; when the first difference value is negative and the second remaining capacity is less than a minimum capacity, prohibit switching the master earphone to be the second earphone.

In the electronic device provided by the second aspect, the processor is further configured to: acquire a type and a running time of the first application, determine the number of earphones running the first application according to the type, calculate the first remaining capacity of the first earphone and the second remaining capacity of the second earphone according to the number of earphones and the running time, and determine whether it is required to stop switching between the master and slave earphones according to the first remaining capacity and the second remaining capacity.

In the electronic device provided by the second aspect, the processor is specifically configured to: when both the first remaining capacity and the second remaining capacity are less than a minimum capacity, stopping switching between the master and slave earphones.

Referring to FIG. 1, FIG. 1 is a schematic view of a connection manner between a wearable apparatus, such as a headset comprising two earphones, provided by an embodiment of the present disclosure and an electronic device provided by an embodiment of the present disclosure. The wireless headset can be connected in communication with the electronic device through a wireless network (e.g., Bluetooth, infrared, or WiFi). It needs to be noted that the wireless headset can comprise one or more earphones, and embodiments of the present disclosure do not limit. In specific implementation, the wireless headset can send a matching request to the electronic device, and the electronic device can receive the matching request sent from the wearable apparatus. The wearable apparatus comprises at least one independent component. In response to the matching request, the number of components included by the wearable apparatus is detected, and information of the wearable apparatus, such as capacity, the number of matching, and so on, is displayed according to the number of components.

Figure 1A:
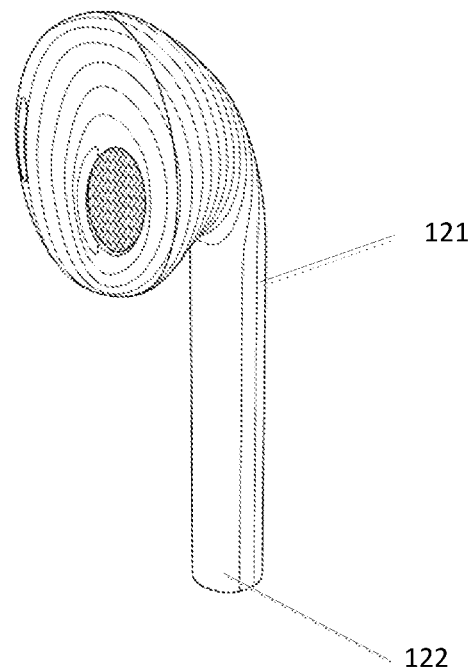
FIG. 1a is a structural schematic view of an earphone of a wireless apparatus provided by an embodiment of the present disclosure.

As shown in FIG. 1a, FIG. 1a is a structural view of an earphone of a wearable apparatus, such as a wireless headset, provided by an embodiment of the present disclosure. As shown in FIG. 1a, two earphones can be entirely disposed separately. As shown in FIG. 1a, the wireless headset comprises two earphones; each earphone comprises an earphone casing 121 and a battery disposed in the earphone casing 121. The earphone can further comprise a wireless transceiver 122, a processing chip (not shown in the drawings), and a touch panel (not shown in the drawings), the processing chip is electrically connected with the touch panel and the wireless transceiver, the battery supplies power to all electronic components in the earphone, the electronic components include but are not limited to the wireless transceiver 122, the processing chip, the touch panel, etc. Specifically, the manner of the electronic connections can be connections in the form of a bus; of course, in actual applications, the aforesaid electronic connections can also be connections in other connecting forms.

Figure 1B:
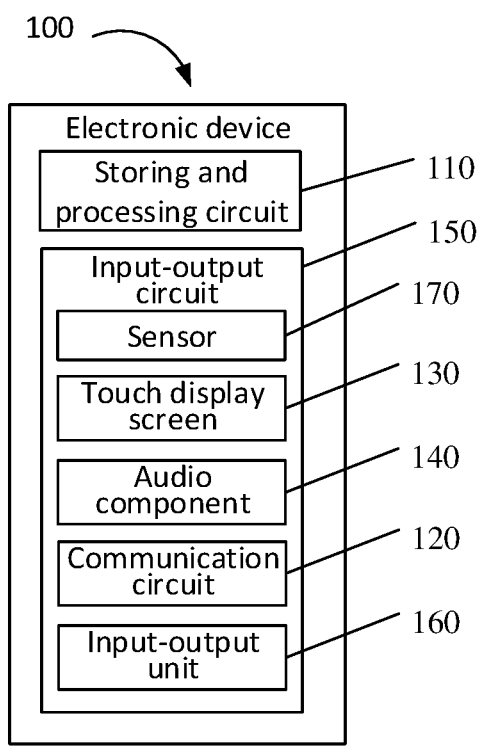
FIG. 1b is a block diagram of an electronic device provided by an embodiment of the present disclosure.

Referring to FIG. 1b, FIG. 1b is a block diagram of an electronic device 100 disclosed by an embodiment of the present disclosure. The electronic device comprises a storing and processing circuit 110, and a communication circuit 120 and an audio component 140 which are connected with the storing and processing circuit 110; wherein, in some certain electronic devices 100, a display component 130 or a touch control component can be further disposed.

The electronic device 100 can comprise a control circuit, and the control circuit can comprise the storing and processing circuit 110. The storing and processing circuit 110 can be a memory, such as a hard disk drive memory, a non-volatile memory (e.g., a flash memory or other electronic programmable read-only memories used to form a solid-state drive, etc.), a volatile memory (e.g., static or dynamic random access memories, etc.), and the like, and are not limited in the embodiment of the present disclosure. The processing circuit in the storing and processing circuit 110 can be used to control the operation of the electronic device 100. The processing circuit can be implemented based on one or more microprocessors, microcontrollers, digital signal processors, baseband processors, power management units, audio codec chips, specific integrated circuits, display driver integrated circuits, etc.

The storing and processing circuit 110 can be used to run software in the electronic device 100, such as a Voice over Internet Protocol (VOIP) telephone call application, a simultaneous translation function, a media playback application, an operating system function, etc. The software can be used to perform some control operations, for example, camera-based image capturing, ambient light measurement based on ambient light sensors, proximity sensor measurement based on proximity sensors, information display functions implemented based on status indicators such as status indicator lamps of light emitting diodes, touch event detection based on touch sensors, operations associated with performing wireless communication functions, operations associated with collecting and generating audio signals, control operations associated with collecting and processing button press event data, and other functions in electronic device 100, etc., these are not limited in embodiments of the present disclosure.

The electronic device 100 can further comprise an input-output circuit 150. The input-output circuit 150 can be used to enable the electronic device 100 to implement input and output of data, that is, to allow the electronic device 100 to receive data from an external device and also allow the electronic device 100 to output data from the electronic device 100 to the external device. The input-output circuit 150 can further comprise a sensor 170. The sensor 170 may include an ambient light sensor, a proximity sensor based on light and capacitance, and a touch sensor (for example, a light-based touch sensor and/or a capacitive touch sensor, wherein the touch sensor may be a part of a touch screen and can also be independently used as a touch sensor structure), acceleration sensor, and other sensors.

The input-output circuit 150 can further comprise a touch sensor array (i.e., the display component 130 may be a touch display screen). The touch sensor can be a capacitive touch sensor formed by an array of transparent touch sensor electrodes (such as indium tin oxide (ITO) electrodes), or can be a touch sensor formed using other touch technologies, such as sonic touch, pressure-sensitive touch, resistance touch, optical touch, etc., these are not limited in embodiments of the present disclosure.

The electronic device 100 can further comprise the audio component 140. The audio component 140 can be used to provide audio input and output functions for the electronic device 100. The audio component 140 in the electronic device 100 can include a speaker, a microphone, a buzzer, a tone generator, and other components for generating and detecting sounds.

The communication circuit 120 can be used to provide the electronic device 100 with the ability to communicate with external devices. The communication circuit 120 can comprise analog and digital input-output interface circuits and wireless communication circuits based on radio frequency signals and/or optical signals. The wireless communication circuits in the communication circuit 120 can include a radio frequency transceiver circuit, a power amplifier circuit, a low noise amplifier, a switch, a filter, and an antenna. For example, the wireless communication circuits in the communication circuit 120 can comprise a circuit for supporting Near Field Communication (NFC) by transmitting and receiving near-field coupled electromagnetic signals. For example, the communication circuit 120 can comprise a near field communication antenna and a near field communication transceiver. The communication circuit 120 can further comprise a cellular phone transceiver and an antenna, a wireless local area network transceiver circuit and an antenna, and so on.

The electronic device 100 can further comprise a battery, a power management circuit and other input-output units 160. The input-output units 160 can include a button, a joystick, a click wheel, a scroll wheel, a touch pad, a keypad, a keyboard, a camera, light-emitting diodes, or other status indicators.

Users can input instruction through the input-output circuit 150 to control operation of the electronic device 100, and can use output data of the input-output circuit 150 to implement reception of status information and other outputs coming from the electronic device 100.

Figure 2:
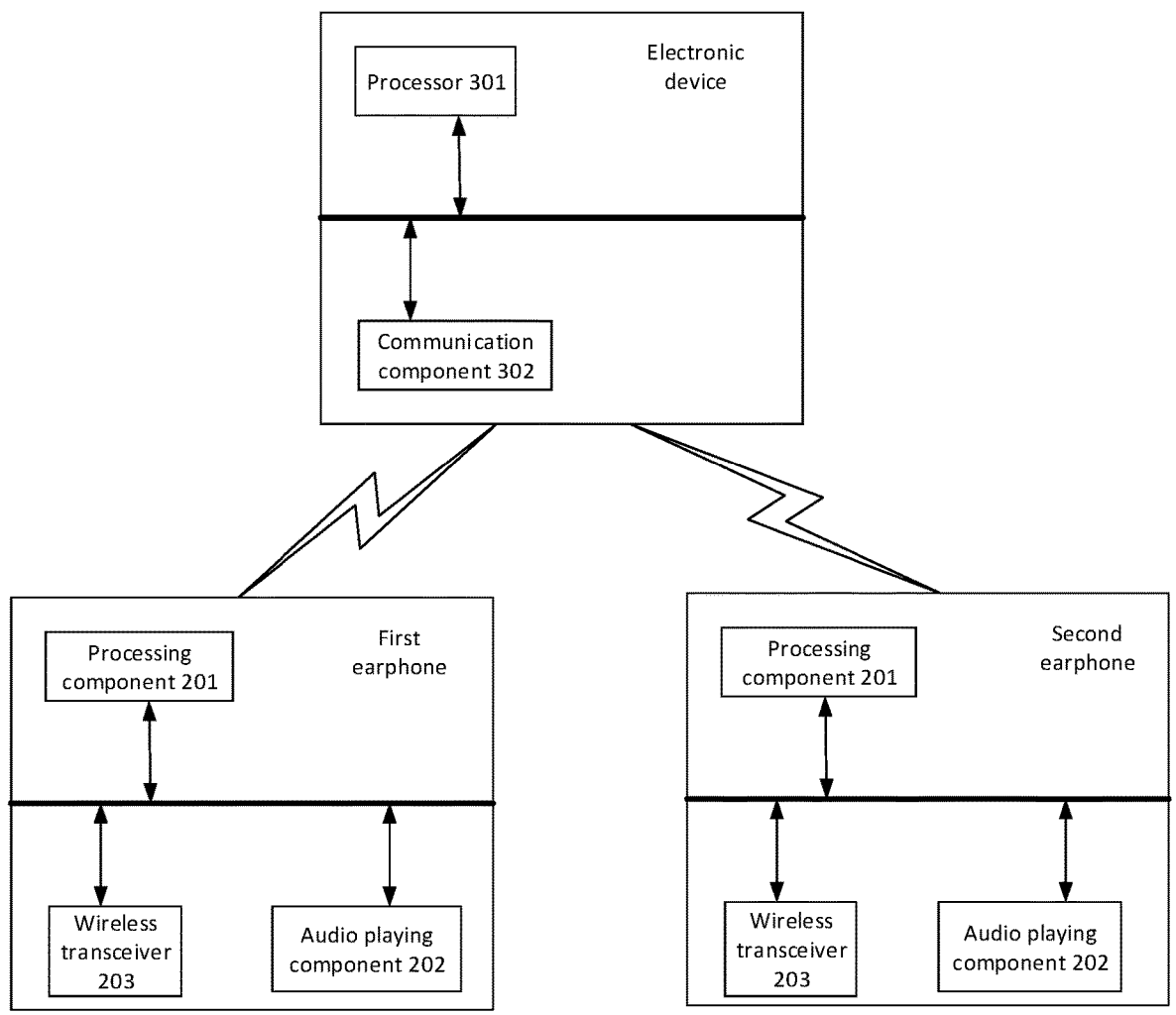
FIG. 2 is a block diagram of a wireless connection between a wearable apparatus provided by an embodiment of the present disclosure and an electronic device provided by an embodiment of the present disclosure.

The present disclosure provides an electronic device, the electronic device is connected with a wearable apparatus. Referring to FIG. 2, FIG. 2 is a block diagram of a wireless connection between an electronic device provided by an embodiment of the present disclosure and a wearable apparatus provided by an embodiment of the present disclosure. As shown in FIG. 2, the wearable apparatus comprises a first earphone and a second earphone; wherein, the first earphone or the second earphone can comprise: a processing component 201, an audio playing component 202, and a wireless transceiver 203; wherein, the processing component 201 is connected with the audio playing component 202 and the wireless transceiver 203 respectively; the audio playing component can be of many types, such as a speaker, or a bone conduction acoustic component. The electronic device as shown in FIG. 2 comprises: a communication component 301, and a processor 302, wherein the processor 302 is electrically connected with the communication component.

In this embodiment, the communication component 301 is configured to implement wireless connection with the wearable apparatus, and acquire the first earphone audio type matching a first earphone and a second earphone audio type matching a second earphone through the wireless communication; wherein different audio types correspond to different priorities;

As detailed above, the first earphone audio type is determined through an application playing audio of the first earphone, and the second earphone audio type is determined through an application playing audio of the second earphone.

The aforesaid wireless connection can specifically be wireless connection manners such as Bluetooth connection, WiFi connection, radio frequency connection, etc. Of course, in actual application, other wireless connection manners can also be adopted. The present disclosure does not limit specific manners of the aforesaid wireless connection.

The processor 302 is used to determine a first application currently operating, and determine, according to the first application, the first earphone audio type, and the second earphone audio type, whether to perform switching between a master earphone and a slave earphone.

In the technical solution provided by the present disclosure, after implementing the wireless connection with the wearable apparatus, the first earphone audio type of the first earphone and the second earphone audio type of the second earphone are acquired through the wireless connection; then after the first application is determined, the switching strategy of the master and slave earphones is determined and performed according to the first application, the first earphone audio type, and the second earphone audio type; in this way, it is possible to dynamically switch to earphones matching the application according to different applications;

and in this way, the experience and endurance of the earphones can be improved, and the experience of users is improved.

Technical effect of the present disclosure is described below with an example. Herein, the wearable apparatus takes a wireless headset as an example, and its corresponding application can be a call application and a music application. For the first earphone, through the application playing audio of the first earphone, it is determined that the application of the first earphone audio type can be the call application; for the second earphone, through the application playing audio of the second earphone, it is determined that the application of the second earphone audio type can be the music application. Thus, when the electronic device is in the call application, if a current main earphone is the second earphone, the electronic device can perform switching between a master earphone and a slave earphone, that is, switch the first earphone to be the master earphone and switch the second earphone to be the slave earphone; such switching can make the call application be more suitable for the first earphone, so that call efficiency can be improved, and thereby experience of earphones are improved, and endurance can be improved. When the electronic device is in the music application, if a current main earphone is the first earphone, the electronic device can perform switching between a master earphone and a slave earphone, that is, switch the second earphone to be the master earphone and switch the first earphone to be the slave earphone; such switching can make the music application be more suitable for the second earphone, so that call efficiency can be improved, and thereby experience of earphones are improved, and endurance can be improved.

Alternatively, a specific implementation method of the aforesaid determining, according to the first application, the first earphone audio type, and the second earphone audio type, whether to perform switching between a master earphone and a slave earphone can be: the processor 302 is specifically used to: in response to determining that the master earphone is the first earphone, and the audio type determined by the first application belongs to the first earphone audio type, not perform switching between the master earphone and the slave earphone; in response to determining that the master earphone is the first earphone, and the audio type determined by the first application does not belong to the first earphone audio type but belongs to the second earphone audio type, perform switching between the master earphone and the slave earphone.

Alternatively, a specific implementation method of the aforesaid determining, according to the first application, the first earphone audio type, and the second earphone audio type, whether to perform switching between a master earphone and a slave earphone can be: the processor 302 is specifically used to: in response to determining that the master earphone is the first earphone, and the audio type determined by the first application does not belong to the first earphone audio type but belongs to the second earphone audio type, acquire a first remaining capacity of the first earphone and a second remaining capacity of the second earphone, and calculate a first difference value between the second remaining capacity and the first remaining capacity; when the first difference value is larger than a capacity threshold value, perform switching between the master earphone and the slave earphone; when the first difference value is a negative value and is less than the capacity threshold value, not perform switching between the master earphone and the slave earphone.

The purpose of such setting is to avoid a too large difference between capacities of the first earphone and of the second earphone. For the first earphone and the second earphone, taking separate earphones as an examples, they have individual batteries and power supply systems, that is, capacities cannot be shared between the first earphone and the second earphone; thus, it may be caused that remaining capacities of the first earphone and of the second earphone are different. For the master/slave earphone mode, power consumption of a master earphone is generally larger than power consumption of a slave earphone; thus, if switching between the master and slave earphones needs to be performed, for example, it is required to switch the master earphone from the first earphone to the second earphone, the second remaining capacity of the second earphone may be much less than the first remaining capacity of the first earphone. In this condition, if switching between the master and slave earphones is still performed, it is inevitable to increase the difference between the remaining capacities of the first earphone and of the second earphone. Therefore, this solution prohibits switching in this condition, that is, in the condition that the difference is large and the remaining capacity of the second earphone is small, it is prohibited to switch the main earphone to be the second earphone, such that the remaining capacity of the second earphone is protected to a certain extent, and capacities of the first earphone and of the second earphone are made to keep balance.

Alternatively, in one embodiment, the aforesaid first earphone and second earphone can be exchanged. The first earphone and the second earphone in the present disclosure are merely intended to distinguish the two earphones and do not have other limits.

Alternatively, the processor 302 is further used to: when the first difference value is a negative value and is less than the capacity threshold value, delay for a setting time, acquire the first remaining capacity and the second remaining capacity again, and calculate a second difference value between the second remaining capacity and the first remaining capacity after the setting time; when the second difference value is a negative value and is less than the capacity threshold value, determine not performing switching between the master earphone and the slave earphone.

The technical solution herein checks the first difference value by calculating the difference value between the remaining capacities of the two earphones again after delaying for the setting time, such that the problem of frequently switching between the master and slave earphones caused by errors in checking capacities is avoided.

Alternatively, the processor 302 is further used to: acquire a type and a running time of the first application, determine the number of earphones running the first application according to the type, calculate the remaining capacity of the first earphone and the remaining capacity of the second earphone according to the number of earphones and the running time, and determine whether it is required to stop switching between the master and slave earphones according to the remaining capacity of the first earphone and the remaining capacity of the second earphone.

This technical solution determines the number of earphones requiring running through the type of the run first application, then calculates the first remaining capacity and the second remaining capacity according to the number of earphones and the running time, and thereby determines whether to stop switching between the master and slave earphones. The technical solution avoids a master earphone that is not switched for a long time from causing too much difference between the remaining capacity of the main earphone and the remaining capacity of the slave earphone, which may aggravate the difference between capacities of the first and second earphones.

The above determining whether it is required to stop switching between the master and slave earphones according to the remaining capacity of the first earphone and the remaining capacity of the second earphone can specifically comprise: the processor is specifically used to: when both the remaining capacity of the first earphone and the remaining capacity of the second earphone are less than a minimum capacity, stop switching between the master and slave earphones.

Figure 3:
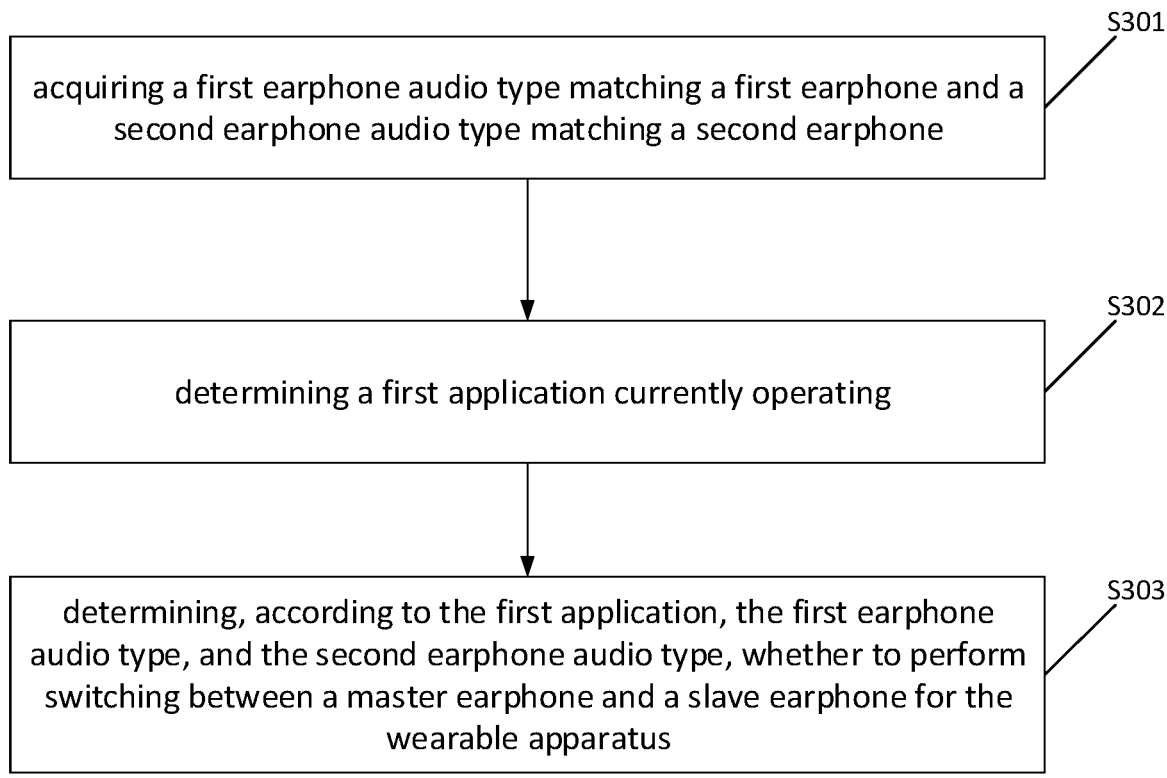
FIG. 3 is a schematic flow chart of a master/slave switching method for a wearable apparatus provided by an embodiment of the present disclosure.

Referring to FIG. 3, FIG. 3 is a schematic flow chart of a master/slave switching method for a wearable apparatus provided by an embodiment of the present disclosure. The wearable apparatus comprises a first earphone and a second earphone, one of the first and second earphones is defined as a master earphone and the other of the first and second earphones is defined as a slave earphone. The method can be implemented by the terminal shown as FIG. 1*b* or FIG. 2. The method comprises the following operations.

Operation S301, a first earphone audio type matching the first earphone and a second earphone audio type matching the second earphone are acquired, wherein different audio types correspond to different priorities, and the same audio type of different earphones can also correspond to different priorities.

Operation S302, a first application currently operating is determined.

Operation S303, according to the first application, the first earphone audio type, and the second earphone audio type, whether to perform switching between a master earphone and a slave earphone for the wearable apparatus is determined.

In the technical solution provided by the present disclosure, after implementing the wireless connection with the wearable apparatus, the first earphone audio type of the first earphone and the second earphone audio type of the second earphone are acquired through the wireless connection; then after the first application is determined, the switching strategy of the master and slave earphones is determined and performed according to the first earphone audio type, the first application, and the second earphone audio type; in this way, it is possible to dynamically switch to earphones matching the application according to different applications; and in this way, the experience and endurance of the earphones can be improved, and the experience of users is improved.

Alternatively, the aforesaid determining, according to the first application, the first earphone audio type, and the second earphone audio type, whether to perform switching between a master earphone and a slave earphone for the wearable apparatus specifically comprises:

in response to determining that the master earphone is the first earphone, and the audio type determined by the first application belongs to the first earphone audio type, not performing switching between the master earphone and the slave earphone; in response to determining that the master earphone is the first earphone, and the audio type determined by the first application does not belong to the first earphone audio type but belongs to the second earphone audio type, performing switching between the master earphone and the slave earphone.

Alternatively, the aforesaid determining, according to the first application, the first earphone audio type, and the second earphone audio type, whether to perform switching between a master earphone and a slave earphone for the wearable apparatus specifically comprises: in response to determining that the master earphone is the first earphone, and the audio type determined by the first application does not belong to the first earphone audio type but belongs to the second earphone audio type, acquiring a first remaining capacity of the first earphone and a second remaining capacity of the second earphone, and calculating a first difference value between the second remaining capacity and the first remaining capacity; when the first difference value is larger than a capacity threshold value, performing switching between the master earphone and the slave earphone; when the first difference value is a negative value and is less than the capacity threshold value, not performing switching between the master earphone and the slave earphone.

Alternatively, the method, between the when the first difference value being a negative value and being less than the capacity threshold value and the not performing switching between the master earphone and the slave earphone, further comprises: after a delay setting time, acquiring the first remaining capacity and the second remaining capacity again, and calculating a second difference value between the second remaining capacity and the first remaining capacity after the setting time; when the second difference value is a negative value and is less than the capacity threshold value, determining not performing switching between the master earphone and the slave earphone.

Alternatively, the method further comprises: acquiring a type and a running time of the first application, determining the number of earphones running the first application according to the type, calculating the remaining capacity of the first earphone and the remaining capacity of the second earphone according to the number of earphones and the running time, and determining whether it is required to stop switching between the master and slave earphones according to the remaining capacity of the first earphone and the remaining capacity of the second earphone.

Figure 4:
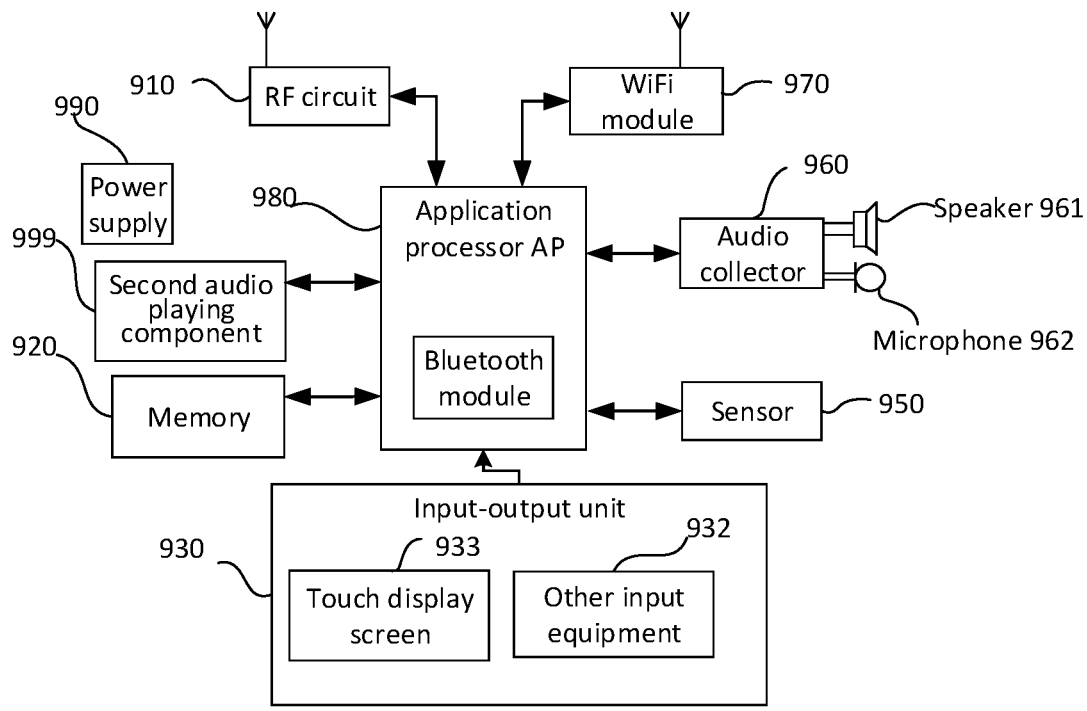
FIG. 4 is a block diagram of some structures of a wearable apparatus provided by an embodiment of the present disclosure.

FIG. 4 shows a block diagram of some structures of a wearable apparatus provided by an embodiment of the present disclosure. Referring to FIG. 4, the wearable apparatus comprises: a radio frequency (RF) circuit 910, a memory 920, an input unit 930, a sensor 950, a first audio playing component 960 (e.g., an audio collector), a wireless fidelity (WiFi) module 970, an application processor AP980, a power supply 990, a second audio playing component 999, and so on. One of ordinary skill in the art can understand that the structure of the wearable apparatus shown in FIG. 4 does not form any limit to the wearable apparatus. The wearable apparatus can comprise components being more or less than shown in the drawings, or combinations of some components, or different arrangements of components, for example, the radio frequency circuit 910 can be connected with one or more antenna(s).

Each component of the wearable apparatus is described in detail below with reference to FIG. 4.

The input unit 930 can be used to receive inputted numerical or character information, and generate key signal input related to user settings and function control of mobile phones. Specifically, the input unit 930 can comprise a touch display screen 933 and other input equipment 932. Specifically, other input equipment 932 may include, but are not limited to, one or more of physical keys, function keys (such as volume control keys, switch keys, etc.), a trackball, a joystick, etc.

Among them, the radio frequency circuit 910 is used to implement wireless connection with the wearable apparatus, and acquire a first earphone audio type of a first earphone of the wearable apparatus and a second earphone audio type of a second earphone of the wearable apparatus through the wireless connection; wherein the priorities of different audio types in different earphones can be different.

The application processor AP 980 is used to determine a first application currently operating, and determine, according to the first application, the first earphone audio type, and the second earphone audio type, whether to perform switching between a master earphone and a slave earphone for the wearable apparatus.

The application processor AP980 is specifically used to: in response to determining that the master earphone is the first earphone, and the audio type determined by the first application belongs to the first earphone audio type, not perform switching between the master earphone and the slave earphone; in response to determining that the master earphone is the first earphone, and the audio type determined by the first application does not belong to the first earphone audio type but belongs to the second earphone audio type, perform switching between the master earphone and the slave earphone.

The application processor AP980 is specifically used to: in response to determining that the master earphone is the first earphone, and the audio type determined by the first application does not belong to the first earphone audio type but belongs to the second earphone audio type, acquire a first remaining capacity of the first earphone and a second remaining capacity of the second earphone, and calculate a first difference value between the second remaining capacity and the first remaining capacity; when the first difference value is larger than a capacity threshold value, perform switching between the master earphone and the slave earphone; when the first difference value is a negative value and is less than the capacity threshold value, not perform switching between the master earphone and the slave earphone.

The application processor AP980 is specifically used to: after a delay setting time, acquire the first remaining capacity and the second remaining capacity again, and calculate a second difference value between the second remaining capacity and the first remaining capacity after the setting time; when the second difference value is a negative value and is less than the capacity threshold value, determine not performing switching between the master earphone and the slave earphone.

The application processor AP980 is specifically used to: acquire a type and a running time of the first application, determine the number of earphones running the first application according to the type, calculate the remaining capacity of the first earphone and the remaining capacity of the second earphone according to the number of earphones and the running time, and determine whether it is required to stop switching between the master and slave earphones according to the remaining capacity of the first earphone and the remaining capacity of the second earphone.

The AP980 is a control center of the wearable apparatus. It uses various interfaces and lines to connect various parts of the entire wearable apparatus. By running or executing software programs and/or modules stored in the memory 920, and calling data stored in the memory 920, various functions of the wearable apparatus are performed and data is processed, so that the wearable apparatus is monitored as a whole. Alternatively, the AP980 can include one or more processing units. Alternatively, the AP980 can integrate an application processor and a modem processor, wherein the application processor mainly processes operating systems, user interfaces, application programs, etc., and the modem processor mainly processes wireless communication. It can be understood that the aforesaid modem processor may also not be integrated into AP980.

In addition, the memory 920 can include a high-speed random access memory, and can also include a non-volatile memory, such as at least one flash memory device or other volatile solid-state storage devices.

The RF circuit 910 can be used for reception and transmission of information. Generally, the RF circuit 910 includes, but is not limited to, an antenna, at least one amplifier, a transceiver, a coupler, a low noise amplifier (LNA), a duplexer, and the like. In addition, the RF circuit 910 can also communicate with networks and other devices through wireless communication. The above-mentioned wireless communication can use any communication standard or protocol, which includes but is not limited to Bluetooth, WiFi, global mobile communication system, general packet radio service, code division multiple access, broadband code division multiple access, long-term evolution, new air interface, etc.

The wearable apparatus can further comprise at least one sensor 950, such as an ultrasonic sensor, an angle sensor, a light sensor, a motion sensor, and other sensors. Specifically, the light sensor can include an ambient light sensor and a proximity sensor, wherein the ambient light sensor can detect brightness of ambient light; the motion sensor can detect whether the wearable apparatus is in an ear-insertion state, so as to adjust brightness of the touch display screen according to the ear-insertion state; the proximity sensor can turn off the touch display screen and/or backlight when the wearable apparatus is moved to an ear. As a kind of motion sensor, an accelerometer sensor can detect magnitudes of accelerations in various directions (usually three-axis), and can detect a magnitude and a direction of gravity when it is stationary. It can be used in applications identifying postures of wearable apparatuses (such as switching between horizontal and vertical screens, related games, magnetometer posture calibration), functions related to vibration recognition (such as pedometer, percussion), etc.; as for wearable apparatuses, other sensors such as a gyroscope, a barometer, a hygrometer, a thermometer, an infrared sensors, etc., can also be configured, and they are not repeated here.

The audio collector 960, the speaker 961, and the microphone 962 can provide an audio interface between a user and the wearable apparatus. The audio collector 960 can transmit an electric signal converted from received audio data to the speaker 961, and the speaker 961 converts it into a sound signal for playback; on the other hand, the microphone 962 converts a collected sound signal into an electric signal, which is converted into audio data after being received by the audio collector 960; the audio data is played to the AP 980 to be processed, and then sent to, for example, a mobile phone via the RF circuit 910, or the audio data is played to the memory 920 for further processing.

WiFi is a short-range wireless transmission technology. The wearable apparatus can help users receive and send data through the WiFi module 970, and it provides users with wireless broadband Internet access. Although FIG. 4 shows the WiFi module 970, it can be understood that it is not a necessary component of the wearable apparatus and can be omitted as needed without changing the essence of the present disclosure.

The wearable apparatus can further comprise a Bluetooth module, the Bluetooth module is used to implement connection with electronic devices. The Bluetooth module can be disposed independently; of course, in actual application, since the chosen application processors are different, it can also be integrated in the application processors.

The wearable apparatus further comprises a power supply 990 (e.g., a battery) supplying power to various components. Alternatively, the power supply can be logically connected with the AP980 through a power management system, so as to implement functions such as managing charging, discharging, power consumption management, and so on through the power management system.

Although not shown, the wearable apparatus can further comprise a camera, a light supplement device, a light sensor, etc., which are not repeated here.

It can be seen that the electronic device in the technical solution provided by the present disclosure acquires the first earphone audio type and the second earphone audio type of the two earphones, and then selects a master earphone and a slave earphone according to the currently operating first application, such that the master and slave earphones match the currently operating first application, and the experience of users is improved.

An embodiment of the present disclosure further provides a computer storage medium, wherein the computer storage medium stores a computer program for electronic data exchange, and the computer program makes a computer perform some or all operations of any master/slave switching method for a wearable apparatus described in the above method embodiments.

An embodiment of the present disclosure further provides a computer program product, wherein the computer program product comprises a non-transitory computer readable storage medium storing a computer program, and the computer program can be operated to make a computer perform some or all operations of any master/slave switching method for a wearable apparatus described in the above method embodiments.

In the above-mentioned embodiments, the description of each embodiment has its own focus. For parts that are not described in detail in a certain embodiment, reference may be made to related descriptions of other embodiments.

In the embodiments provided by the present disclosure, it should be understood that the disclosed device can be implemented in other ways. For example, the device embodiments described above are merely illustrative. For example, the division of the units is only a logical function division. In actual implementation, there may be other division methods, for example, multiple units or components may be combined or may be integrated into another system, or some features can be ignored or not implemented. In addition, the displayed or discussed mutual coupling, or direct coupling, or communication connection, may be indirect coupling or communication connection through some interfaces, devices or units, and may be in electrical or other forms.

The units described as separate components may be or may also not be physically separated, and the components displayed as units may be or may also not be physical units, that is, they may be located in one place, or may also be distributed on multiple network units. Some or all of the units may be selected according to actual requirements to achieve the objectives of the solutions of the embodiments.

In addition, the functional units in the various embodiments of the present disclosure may be integrated into one processing unit, or each unit may physically exist alone, or two or more units may be integrated into one unit. The above-mentioned integrated unit can be implemented in the form of hardware, and can also be implemented in the form of software functional units.

The above is implementation of embodiments of the present disclosure. It should be noted that those of ordinary skill in the art can further make various improvements and embellishments without departing from the principle of the embodiments of the present disclosure, and these improvements and embellishments are also regarded as the protection scope of the present disclosure.

What is claimed is:

1. A master/slave switching method for a wearable apparatus, wherein the wearable apparatus comprises a first earphone and a second earphone, one of the first and second earphones is defined as a master earphone and the other of the first and second earphones is defined as a slave earphone; and the method comprises the following operations:

acquiring a first earphone audio type matching a first earphone and a second earphone audio type matching a second earphone;

determining a first application currently operating; and determining, according to the first application, the first earphone audio type, and the second earphone audio type, whether to perform switching between the master earphone and the slave earphone for the wearable apparatus.

2. The method according to claim 1, wherein the first earphone audio type is determined through an application playing first earphone audio, and the second earphone audio type is determined through application playing second earphone audio.

3. The method according to claim 1, wherein the determining, according to the first application, the first earphone audio type, and the second earphone audio type, whether to perform switching between the master earphone and the slave earphone for the wearable apparatus further comprises:

in response to determining that the master earphone is the first earphone, and the audio type determined by the first application belongs to the first earphone audio type, not performing switching between the master earphone and the slave earphone; and in response to determining that the master earphone is the first earphone, and the audio type determined by the first application does not belong to the first earphone audio type but belongs to the second earphone audio type, performing switching between the master earphone and the slave earphone.

4. The method according to claim 1, wherein the determining, according to the first application, the first earphone audio type, and the second earphone audio type, whether to perform switching between the master earphone and the slave earphone for the wearable apparatus further comprises:

in response to determining that the master earphone is the first earphone, and the audio type determined by the first application does not belong to the first earphone audio type but belongs to the second earphone audio type, acquiring a first remaining capacity of the first earphone and a second remaining capacity of the second earphone, and calculating a first difference value between the second remaining capacity and the first remaining capacity; when the first difference value is larger than a capacity threshold value, performing switching between the master earphone and the slave earphone; when the first difference value is a negative value and is less than the capacity threshold value, not performing switching between the master earphone and the slave earphone.

5. The method according to claim 4, wherein between the when the first difference value being a negative value and being less than the capacity threshold value and the not performing switching between the master earphone and the slave earphone, the method further comprises:

after a delay setting time, acquiring the first remaining capacity and the second remaining capacity again, and calculating a second difference value between the second remaining capacity and the first remaining capacity after the setting time; when the second difference value is a negative value and is less than the capacity threshold value, determining not performing switching between the master earphone and the slave earphone.

6. The method according to claim 1, wherein the determining, according to the first application, the first earphone audio type, and the second earphone audio type, whether to perform switching between the master earphone and the slave earphone for the wearable apparatus further comprises:
in response to determining that the master earphone is the first earphone, and the audio type determined by the first application does not belong to the first earphone audio type but belongs to the second earphone audio type, acquiring a first remaining capacity of the first earphone and a second remaining capacity of the second earphone, and calculating a first difference value between the second remaining capacity and the first remaining capacity; when the first difference value is negative and the second remaining capacity is less than a minimum capacity, prohibiting switching the master earphone to be the second earphone.

7. The method according to claim 1, further comprising:
acquiring a type and a running time of the first application, determining the number of earphones running the first application according to the type, calculating the first remaining capacity of the first earphone and the second remaining capacity of the second earphone according to the number of earphones and the running time, and determining whether it is required to stop switching between the master and slave earphones according to the first remaining capacity and the second remaining capacity.

8. The method according to claim 7, wherein the determining whether it is required to stop switching between the master and slave earphones according to the first remaining capacity and the second remaining capacity further comprises:
when both the first remaining capacity and the second remaining capacity are less than a minimum capacity, stopping switching between the master and slave earphones.

9. The method according to claim 1, wherein the performing switching between the master earphone and the slave earphone further comprises:
switching the second earphone to be the master earphone, and switching the first earphone to be the slave earphone.

10. The method according to claim 1, further comprising:
implementing wireless connection between the wearable apparatus and an electronic device;
wherein the acquiring a first earphone audio type matching a first earphone and a second earphone audio type matching a second earphone, the determining a first application currently operating; and the determining, according to the first application, the first earphone audio type, and the second earphone audio type, whether to perform switching between the master earphone and the slave earphone for the wearable apparatus are performed by the electronic device.

11. The method according to claim 1, wherein the acquiring a first earphone audio type matching a first earphone and a second earphone audio type matching a second earphone, the determining a first application currently operating; and the determining, according to the first application, the first earphone audio type, and the second earphone audio type, whether to perform switching between the master earphone and the slave earphone for the wearable apparatus are performed by the wearable apparatus.

12. An electronic device, comprising a communication element and a processor; wherein,
the communication element is configured to implement wireless connection with a wearable apparatus comprising a first earphone and a second earphone, and acquire the first earphone audio type matching the first earphone and a second earphone audio type matching the second earphone through the wireless connection; wherein one of the first and second earphones is defined as a master earphone and the other of the first and second earphones is defined as a slave earphone; and
the processor is configured to determine a first application currently operating, and determine, according to the first application, the first earphone audio type, and the second earphone audio type, whether to perform switching between the master earphone and the slave earphone for the wearable apparatus.

13. The electronic device according to claim 12, wherein, the processor is further configured to determine the first earphone audio type through an application playing a first earphone audio, and determine the second earphone audio type through application playing a second earphone audio.

14. The electronic device according to claim 12, wherein, the processor is further configured to: in response to determining that the master earphone is the first earphone, and the audio type determined by the first application belongs to the first earphone audio type, not perform switching between the master earphone and the slave earphone; in response to determining that the master earphone is the first earphone, and the audio type determined by the first application does not belong to the first earphone audio type but belongs to the second earphone audio type, perform switching between the master earphone and the slave earphone.

15. The electronic device according to claim 12, wherein, the processor is further configured to: in response to determining that the master earphone is the first earphone, and the audio type determined by the first application does not belong to the first earphone audio type but belongs to the second earphone audio type, acquire a first remaining capacity of the first earphone and a second remaining capacity of the second earphone, and calculate a first difference value between the second remaining capacity and the first remaining capacity; when the first difference value is larger than a capacity threshold value, perform switching between the master earphone and the slave earphone; when the first difference value is a negative value and is less than the capacity threshold value, not perform switching between the master earphone and the slave earphone.

16. The electronic device according to claim 15, wherein, the processor is further configured to: after a delay setting time, acquire the first remaining capacity and the second remaining capacity again, and calculate a second difference value between the second remaining capacity and the first remaining capacity after the setting time; when the second difference value is a negative value and is less than the capacity threshold value, determine not performing switching between the master earphone and the slave earphone.

17. The electronic device according to claim 12, wherein, the processor is further configured to: in response to determining that the master earphone is the first earphone, and the audio type determined by the first application does not belong to the first earphone audio type but belongs to the second earphone audio type, acquire a first remaining capacity of the first earphone and a second remaining capacity of the second earphone, and calculate a first difference value between the second remaining capacity and the first remaining capacity; when the first difference value is negative and the second remaining capacity is less than a minimum capacity, prohibit switching the master earphone to be the second earphone.

18. The electronic device according to claim 12, wherein, the processor is further configured to: acquire a type and a running time of the first application, determine the number of earphones running the first application according to the type, calculate the first remaining capacity of the first earphone and the second remaining capacity of the second earphone according to the number of earphones and the running time, and determine whether it is required to stop switching between the master and slave earphones according to the first remaining capacity and the second remaining capacity.

19. The electronic device according to claim 18, wherein, the processor is further configured to: when both the first remaining capacity and the second remaining capacity are less than a minimum capacity, stopping switching between the master and slave earphones.

20. A non-transitory computer readable storage medium storing a computer program for electronic data exchange, wherein the computer program makes a computer perform a method comprising:

acquiring a first earphone audio type matching a first earphone of a wearable apparatus and a second earphone audio type matching a second earphone of the wearable apparatus, wherein one of the first and second earphones is defined as a master earphone and the other of the first and second earphones is defined as a slave earphone;

determining a first application currently operating; and determining, according to the first application, the first earphone audio type, and the second earphone audio type, whether to perform switching between a master earphone and a slave earphone for the wearable apparatus.

* * * * *